United States Patent
McGee et al.

(10) Patent No.: US 6,516,248 B2
(45) Date of Patent: Feb. 4, 2003

(54) ROBOT CALIBRATION SYSTEM AND METHOD OF DETERMINING A POSITION OF A ROBOT RELATIVE TO AN ELECTRICALLY-CHARGED CALIBRATION OBJECT

(75) Inventors: H. Dean McGee, Rochester Hills, MI (US); Eric Lee, Bloomfield Hills, MI (US); Frank Garza, Rochester Hills, MI (US)

(73) Assignee: Fanuc Robotics North America, Rochester Hills, MI (US)

( * ) Notice: Subject to any disclaimer, the term of this patent is extended or adjusted under 35 U.S.C. 154(b) by 97 days.

(21) Appl. No.: 09/876,620

(22) Filed: Jun. 7, 2001

(65) Prior Publication Data

US 2002/0188379 A1 Dec. 12, 2002

(51) Int. Cl.⁷ ............................................... G05B 19/04
(52) U.S. Cl. .................... 700/254; 700/245; 700/247; 700/251; 700/258; 700/259; 700/262; 318/560; 318/568.11; 318/652; 414/680
(58) Field of Search ................................ 700/247, 245, 700/258, 254, 259, 251, 262; 318/560, 568.11, 652; 414/680

(56) References Cited

U.S. PATENT DOCUMENTS

| | | | |
|---|---|---|---|
| 3,888,362 A | * | 6/1975 | Fletcher et al. ............. 414/620 |
| 4,001,556 A | | 1/1977 | Folchi et al. ................ 700/258 |
| 4,249,062 A | | 2/1981 | Hozumi et al. ......... 219/124.34 |
| 4,530,456 A | | 7/1985 | Michelotti .................. 228/102 |
| 4,531,192 A | | 7/1985 | Cook .......................... 700/258 |
| 4,558,312 A | | 12/1985 | Yonemoto et al. .......... 340/680 |
| 4,575,802 A | * | 3/1986 | Walsh et al. ................ 700/251 |
| 4,865,512 A | | 9/1989 | Kato ............................ 414/680 |
| 5,064,234 A | | 11/1991 | Marozsan et al. ......... 294/64.1 |
| 5,177,563 A | * | 1/1993 | Everett et al. .............. 700/259 |
| 5,214,858 A | | 6/1993 | Pepper et al. ................. 33/558 |
| 5,264,677 A | | 11/1993 | Sato et al. ............. 219/124.34 |
| 5,457,367 A | | 10/1995 | Thorne ................... 318/568.11 |
| 5,471,445 A | | 11/1995 | Emberty et al. ......... 369/30.29 |
| 5,489,759 A | | 2/1996 | Litt et al. ............... 219/124.34 |
| 5,562,843 A | | 10/1996 | Yasumoto .............. 219/124.34 |
| 5,726,915 A | * | 3/1998 | Prager et al. .................. 455/24 |
| 5,740,328 A | | 4/1998 | Ravani et al. .............. 700/258 |
| 5,910,719 A | | 6/1999 | Thorne ........................ 318/560 |
| 6,008,612 A | | 12/1999 | Tanaka et al. .............. 318/652 |
| 6,070,109 A | | 5/2000 | McGee et al. .............. 700/259 |
| 6,097,168 A | | 8/2000 | Katoh et al. ........... 318/568.11 |
| 6,385,435 B1 | * | 5/2002 | Lee .............................. 455/24 |
| H65 H | * | 5/1986 | Beni et al. .................. 414/730 |

OTHER PUBLICATIONS

Sanchez et al., Robot–arm pick and place behavior programming system using visual perception, 2000, IEEE, pp. 507–510.*

* cited by examiner

Primary Examiner—William A. Cuchlinski, Jr.
Assistant Examiner—McDieunel Marc
(74) Attorney, Agent, or Firm—Howard & Howard

(57) ABSTRACT

A robot calibration system for calibrating a robot and a method of determining a position of the robot to calibrate the robot are disclosed. The system includes an electrical ground defining a return for an electrical circuit. The robot, which is electrically connected to the ground, includes an arm having a tool surface operating within a robot workspace. The system also includes an electrical supply and a detection device. The electrical supply defines a source for the circuit and provides a charge and a reference voltage to the system. The detection device communicates with the electrical supply to detect variations in either the charge, the reference voltage, or both. The system further includes a calibration object. The calibration object is electrically insulated from the ground and is electrically connected to the electrical supply. The calibration object receives the charge and the reference voltage from the electrical supply to determine the position of the robot relative to the calibration object when the tool surface moves toward the calibration object to electrically interact with the calibration object.

23 Claims, 2 Drawing Sheets

ROBOT CALIBRATION SYSTEM AND METHOD OF DETERMINING A POSITION OF A ROBOT RELATIVE TO AN ELECTRICALLY-CHARGED CALIBRATION OBJECT

FIELD OF THE INVENTION

The subject invention generally relates to a robot calibration system for calibrating a robot and a method of determining a position of the robot relative to a calibration object that is external to the robot. More specifically, the subject invention relates to the robot calibration system having an electrically-charged calibration object that enables the position of the robot to be determined when the robot electrically interacts with the electrically-charged calibration object.

BACKGROUND OF THE INVENTION

Robots are utilized across many industries to conduct various operations on workpieces. A robot includes a robot arm having a tool surface, or tool, for conducting the various operations on workpieces. As one example, a robot may include a waterjet tool that is utilized to cut through a particular workpiece. Generally, it is required that the robot is calibrated in order to accurately conduct an operation on a workpiece. It is also required that the robot maintain calibration throughout the operation to ensure that the robot is able to repeat the operation. However, as robots conduct the various operations, the calibration of the robot frequently changes due to uncontrollable and/or inadvertent events, such as an inadvertent collision with the workpiece. As such, it is necessary to have systems and methods for calibrating the robot. As appreciated, systems and methods for calibrating the robot are critical to the safe and optimal utilization of robots in industries such as arc welding, spot welding, waterjet cutting, and dispensing.

Systems for calibrating robots are known in the art. Similarly, methods of determining a position of a robot for purposes of calibrating the robot are also known in the art. The conventional systems and methods for calibrating robots utilize electrical continuity to detect contact between the robot and a calibration object. Once the contact between the robot and the calibration object is detected, the position of the robot relative to the calibration object can be determined, and the robot can be calibrated.

The conventional systems and methods that rely on electrical continuity electrically charge the tool disposed on the robot and electrically ground the calibration object in order to detect contact between the robot and calibration object. The systems and methods of the prior art that electrically charge the tool disposed on the robot are inadequate because they are unduly burdensome as electrically-charged robot tooling is not easily achieved. More specifically, to electrically charge the tool, these systems and methods ignore the fact that the robot is typically already grounded and, instead, require additional electric circuitry and other components to override the ground of the robot and to charge the tooling. Furthermore, these systems and methods may be considered unsafe. For example, if the tool disposed on the robot is a spot weld tool, then great care must be observed to ensure that high process voltages and currents associated with the spot weld tool are not inadvertently applied during calibration. Also, when using electrically-charged tooling, a robot operator may be required to approach the robot to connect additional electric circuitry required for a complete circuit. An example of such a conventional system and method is disclosed in U.S. Pat. No. 5,910,719 to Thorne. Specifically, the '719 patent to Thorne requires that an alligator clip, i.e., additional electrical circuitry, be connected from a spot weld tool to the calibration object, and more likely than not, the robot operator would be responsible for approaching the robot and making this connection. A further example of such a conventional system and method is disclosed in U.S. Pat. No. 4,558,312 to Yonemoto et al. The '312 patent to Yonemoto et al. charges the tool and grounds the calibration object.

In sum, the conventional systems and methods for calibrating robots that rely on electrical continuity, as detailed above, are characterized by one or more inadequacy. Due to the inadequacies identified in the prior art, it is desirable to provide a novel robot calibration system and method of determining a position of a robot relative to an electrically-charged calibration object for calibrating the robot that is safe and is not unduly burdensome.

SUMMARY OF THE INVENTION AND ADVANTAGES

A robot calibration system is disclosed. The robot calibration system according to the subject invention is utilized for calibrating a robot. A method of determining a position of the robot relative to a calibration object is also disclosed. The position of the robot relative to the calibration object is also utilized for calibrating the robot. The robot calibration system includes a ground. The ground defines a return for an electrical circuit. The robot is electrically connected to the ground and includes at least one robot arm having a tool surface operating within a robot workspace.

The robot calibration system also includes an electrical supply and a detection device. The electrical supply defines a source for the electrical circuit. The source provides an electrical charge and a calibration reference voltage to the calibration system. The detection device of the robot calibration system is in electrical communication with the electrical supply. The detection device detects a variation in at least one of the electrical charge and the calibration reference voltage. That is, the detection device detects the variation in the electrical charge, in the calibration reference voltage, or in both the charge and the voltage.

The robot calibration system further includes a calibration object external to the robot. The calibration object is electrically insulated from the ground and is electrically connected to the electrical supply. The calibration object receives the electrical charge and the calibration reference voltage from the electrical supply. In operation, the robot is moved from an initial position, where the tool surface is spaced from the calibration object, toward the calibration object such that the tool surface electrically interacts with the calibration object. When the tool surface of the robot electrically interacts with the calibration object, the detection device detects a variation in at least one of the electrical charge and the calibration reference voltage. As such, the position of the robot relative to the calibration object can be determined upon the electrical interaction between the tool surface of the robot and the calibration object for calibrating the robot.

Accordingly, by utilizing an electrically-charged calibration object and not charging the tool surface of the robot, the subject invention provides the unexpected advantage of minimizing the amount of electrical components required to detect variations in the electrical charge and in the calibration reference voltage provided to the calibration object. The subject invention also enhances operator safety as it does not require an operator to approach the robot thereby minimizing any risk of injury to the operator. Also, by electrically-charging the calibration object, and not the tool on the robot, the subject invention takes advantage of the existing ground for the robot. Furthermore, the subject invention optimizes the calibration of the robot by providing for automatic and unattended calibration of the robot without changes or additions to existing robot tooling.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
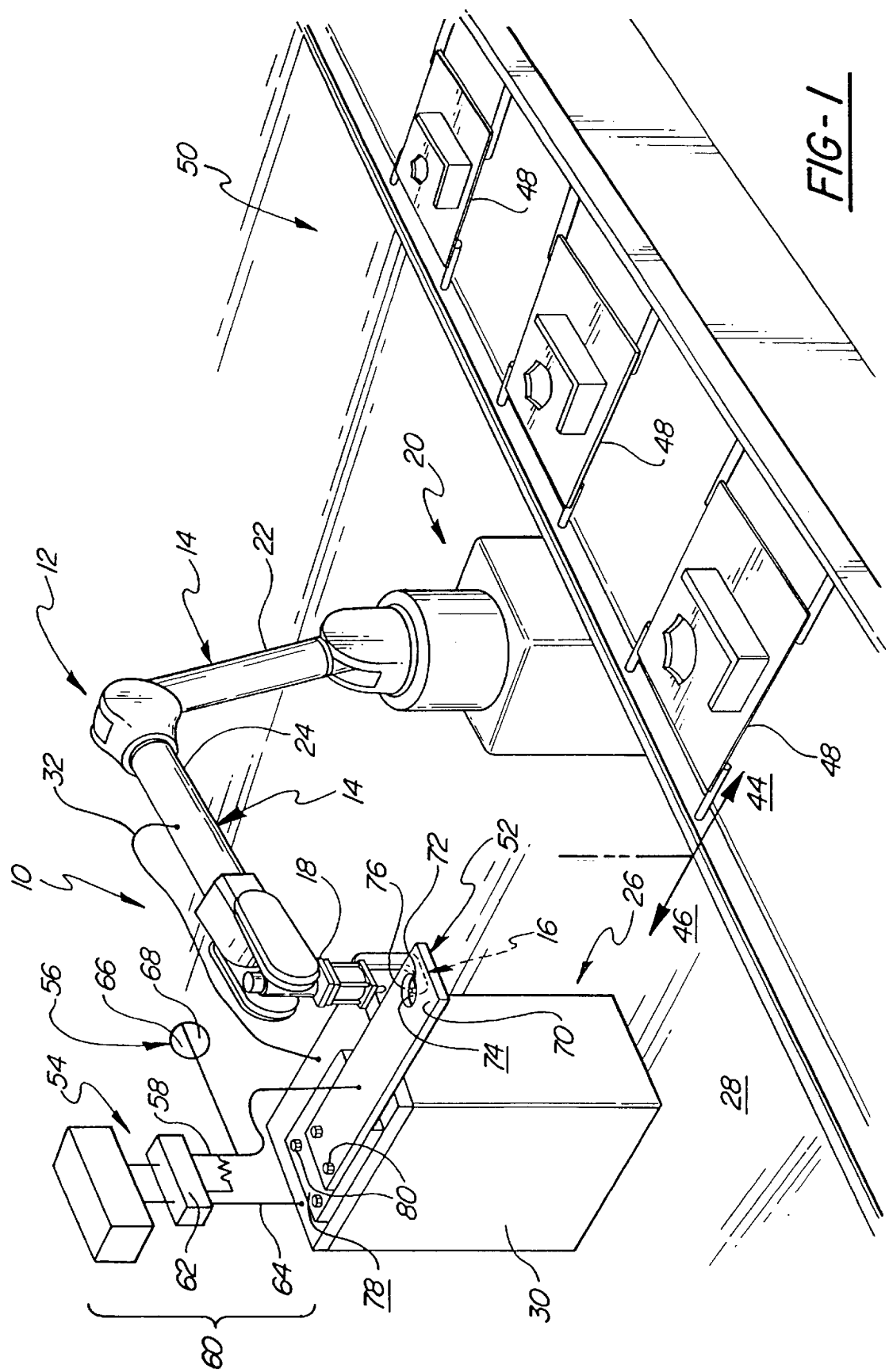
FIG. 1 is an overall perspective view of a robot calibration system having a spot weld robot electrically interacting with an electrically-charged calibration object by contacting the calibration object, and the robot calibration system is in combination with an assembly line having at least one workpiece.

Referring to the Figures, wherein like numerals indicate like or corresponding parts throughout the several views, a robot calibration system is generally shown at 10. The robot calibration system 10 of the subject invention is utilized for calibrating a robot 12. As disclosed in the Figures, the robot 12 includes at least one robot arm 14 having a tool surface 16. Preferably, the robot 12 includes a face plate 18, a base support 20, and first and second arms 22, 24 as disclosed in FIG. 1. However, it is to be understood that the number of robot arms 14, as well as the number of tool surfaces 16 associated with the robot arm 14 or arms 14, does not vary the scope of the subject invention. An operator of the robot 12, not shown in the Figures, understands a geometrical relationship of the tool surface 16. The operator determines the geometrical relationship between the tool surface 16 of the robot arm 14 and the robot 12 such that it is 'recognized' where the tool surface 16 is located. It is to be understood that, within the context of the subject invention, the tool surface 16 of the robot arm 14 can be a surface on the robot arm 14 itself, can be a surface on a tool that is disposed on the robot arm 14, or can be the tool itself. For descriptive purposes, all of these possibilities will be described below only in terms of the tool surface 16.

The robot calibration system 10 includes a ground 26. For purposes of the subject invention, the ground 26 is defined as any object that makes an electrical connection with the earth 28. Of course, the ground 26 may be the earth 28 itself. For descriptive purposes only, the ground 26 is hereinafter referred to as an electrical ground 26. The electrical ground 26 defines a return for an electrical circuit. The electrical ground 26 is represented in the Figures as an appropriately grounded work table 30, preferably a standard metal work table. The robot 12 is electrically connected to the electrical ground 26 via a robot ground connection 32 as disclosed in the Figures. As appreciated by those skilled in the art, the robot 12 is normally grounded. As such, it is also appreciated that no additional electrical connections are required to ground the robot 12.

Figure 2:
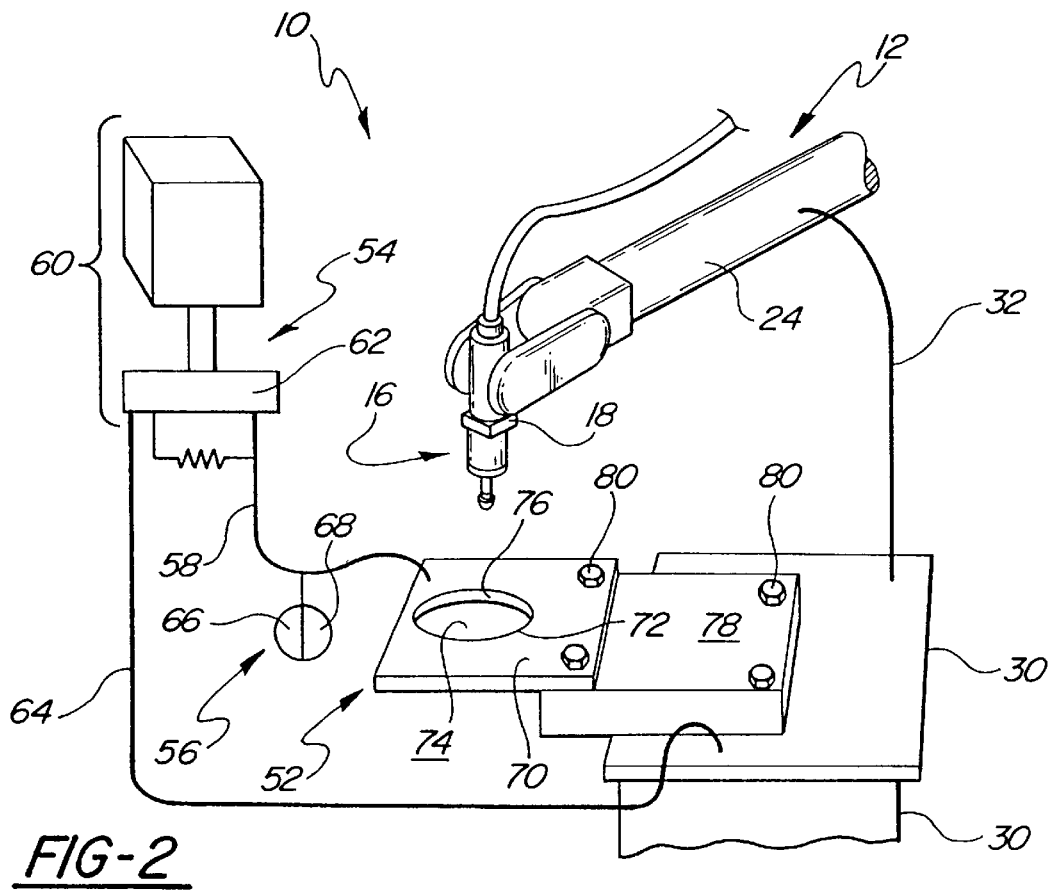
FIG. 2 is a perspective view of the robot calibration system having a waterjet robot electrically interacting with the calibration object by moving into a proximity of the calibration object.
Figure 3:
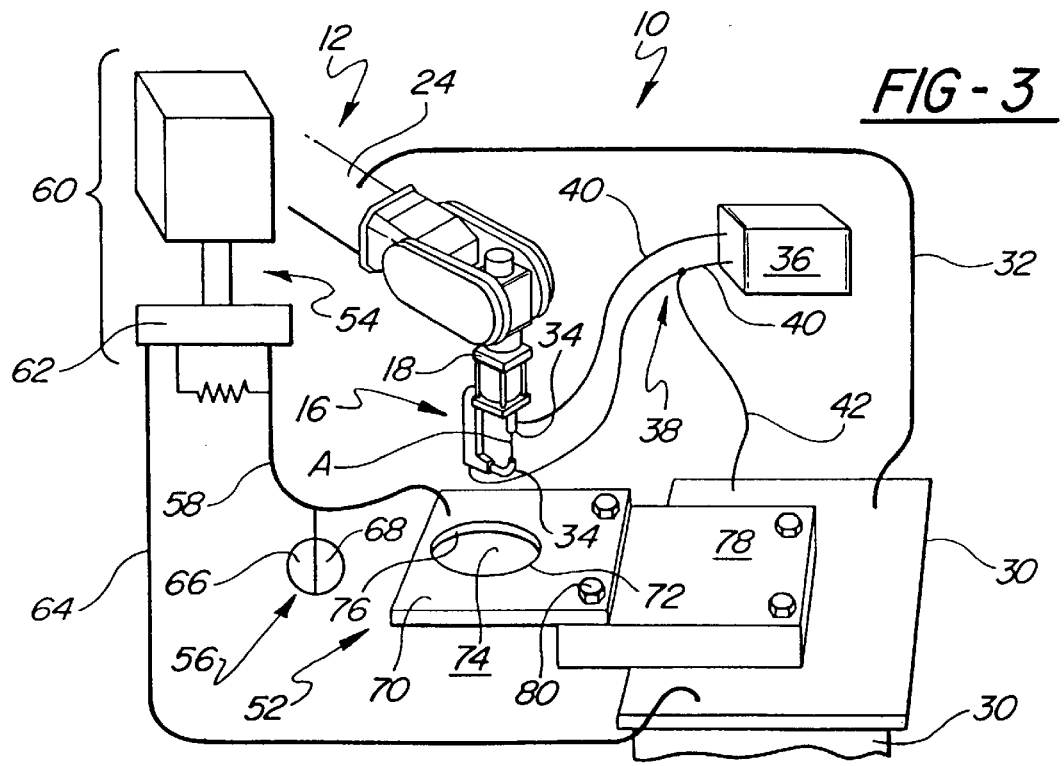
FIG. 3 is a perspective view of the robot calibration system with the spot weld robot electrically interacting with the calibration object by moving into a proximity of the calibration object.

Referring to FIGS. 1 and 3, the robot 12 is a welding robot, specifically a spot weld robot, and the tool surface 16 of the spot weld robot is a spot weld tool including first and second welding tips, not numbered in the Figures. As best disclosed in FIG. 3, each of the welding tips have a normally parallel and coincident contact surface 34 with a normal axis A extending between the contact surfaces 34. The normal axis A indicates alignment of the contact surfaces 34. The spot weld robot includes a spot weld transformer 36. The spot weld transformer 36, using a secondary loop 38, charges the first and second welding tips through electrical outputs 40 of the secondary loop 38. The secondary loop 38 is also electrically connected to the electrical ground 26 through a secondary loop ground connection 42. The spot weld robot having the spot weld tool is the most preferred robot 12 for use with the subject invention. Alternatively, as disclosed in FIG. 2, the robot 12 is a waterjet robot and the tool surface 16 of the waterjet robot is a waterjet tool. Of course the type of robot 12 and the type of tool surface 16 associated with the robot 12 is not intended to vary the scope of the subject invention.

The tool surface 16 of the robot arm 14 operates within a robot workspace, not numbered in the Figures. The robot workspace more specifically includes a robot operating workspace 44 and a robot calibration workspace 46 that is distinct from the robot operating workspace 44. The tool surface 16 of the robot arm 14 operates within the robot operating workspace 44 to conduct various operations on at least one workpiece 48. Preferably, the robot 12 operates in combination with an assembly line 50 having more than one workpiece 48 as disclosed in FIG. 1. The assembly line 50 is disposed in the robot operating workspace 44 such that tool surface 16 of the robot arm 14 conducts operations on the workpieces 48 in the robot operating workspace 44. On the other hand, the robot 12 is calibrated in the robot calibration workspace 46. The robot 12 is calibrated by determining a position of the robot 12 relative to a calibration object 52. The calibration object 52 will be described in detail below.

The robot calibration system 10 also includes an electrical supply 54 and a detection device 56. Both the electrical supply 54 and the detection device 56 are represented schematically in the Figures. The electrical supply 54 defines a source for the electrical circuit. The source provides an electrical charge and a calibration reference voltage to the robot calibration system 10. The calibration reference voltage provided by the source is preferably 24 volts. However, the source may provide other voltages as the calibration reference voltage without varying the scope of the subject invention. More specifically, an electrical input lead 58, connected between the electrical supply 54 and the calibration object 52, provides the electrical charge and the calibration reference voltage. The electrical input lead 58 will be described further below. In the preferred embodiment of the subject invention, a robot controller 60, disclosed schematically in the Figures, operates to control motion of the robot 12. The robot controller 60 also operates as the electrical supply 54. As such, the robot controller 60 defines the source for the electrical circuit and provides the electrical charge and the calibration reference voltage to the robot calibration system 10, specifically to the calibration object 52. It is to be understood that any I/O interface device associated with the robot controller 60, such as the I/O interface device 62 schematically represented in the Figures, is suitable for providing the electrical charge and the calibration reference voltage to the robot calibration system 10. As with the robot 12, the electrical supply 54, preferably the I/O interface device 62, is also electrically connected to the electrical ground 26. The subject invention preferably incorporates an interface device ground connection 64 for electrically connecting the I/O interface device 62 to the electrical ground 26. It is not required that the robot controller 60 operate as the electrical supply 54. Instead, other electrical devices external to the robot controller 60 can operate as the electrical supply 54 so long as such devices are suitable for providing the electrical charge and the calibration reference voltage to the calibration object 52.

The detection device 56 is in electrical communication with the electrical supply 54. The detection device 56 monitors the electrical charge and the calibration reference voltage provided to the calibration object 52. The detection device 56 monitors the electrical charge and the calibration reference voltage in order to detect a variation in at least one of the electrical charge and the calibration reference voltage. That is, the detection device 56 detects the variation either in the electrical charge, in the calibration reference voltage, or in both the electrical charge and the calibration reference voltage. More specifically, the detection device 56 is electrically connected to the electrical input lead 58 for detecting the variations.

As with the electrical supply 54, the robot controller 60 also operates as the detection device 56 in the preferred embodiment. In the preferred embodiment, the robot controller 60 is in electrical communication with the electrical supply 54. As such, the robot controller 60 detects the variation in at least one of the electrical charge and the calibration reference voltage. It is not required that the robot controller 60 operate as the detection device 56. Instead, other electrical devices external to the robot controller 60 can operate as the detection device 56, such as the detection device 56, so long as such devices are suitable for detecting the variation in at least one of the electrical charge and the calibration reference voltage. In preferred embodiments of the subject invention, the detection device 56 can be either a voltage detector 66 or a capacitance detector 68 as described below. Alternatively, the detection device 56 can include, among other detection devices 56, inductance or hall effect detection devices. In terms of the preferred embodiments, the voltage detector 66 and the capacitance detector 68 are represented schematically in the Figures, and suitable voltage and capacitance detectors 66, 68 are known in the art.

The calibration object 52 of the robot calibration system 10 is external to the robot 12 and is disposed in the robot calibration workspace 46 where the robot 12 is to be calibrated. In other words, the calibration object 52 can be spaced from the robot 12, which is preferred, or the calibration object 52 can actually be mounted on the robot 12 so long as the robot arm 14 can access the calibration object 52. As with the tool surface 16, the operator of the robot 12 understands a geometry of the calibration object 52. The calibration object 52 is electrically insulated from the electrical ground 26 and is electrically connected to the electrical supply 54. As referenced above and as disclosed in the Figures, the calibration object 52 is connected to the electrical supply 54 via the electrical input lead 58 from the electrical supply 54. In the preferred embodiment, the electrical input lead 58 is connected to the I/O interface device 62 associated with the robot controller 60. Also in the preferred embodiment, a resistor, shown schematically but not numbered in the Figures, may be utilized for protection of the electrical circuit by controlling current and voltage. The electrical input lead 58 is electrically connected between the electrical supply 54 and the calibration object 52 for delivering the electrical charge and the calibration reference voltage to the calibration object 52.

Preferably, the calibration object 52 is a calibration plaque 70 that is electrically insulated from the electrical ground 26 and electrically connected to the electrical supply 54. The calibration plaque 70 preferably includes an outer facing, not numbered, and at least one calibration element 72. The calibration element 72 of the calibration plaque 70 defines a bounded void 74 having an inner surface 76. However, it is also possible that the calibration object 52 is not a calibration plaque 70. Instead, the calibration object 52 and the workpiece 48 may be differently contoured or may be the same component. That is, although not preferred, it is within the scope of the subject invention that the workpiece 48, which is the component that the robot 12 is to conduct an operation on, can be electrically connected to the electrical supply 54 to receive the electrical charge and the calibration reference voltage, and the robot 12 can be calibrated by determining the position of the robot 12 relative to the workpiece 48. In this alternative embodiment, the robot operating workspace 44 and the robot calibration workspace 46 are the same workspaces.

To electrically insulate the calibration object 52 from the electrical ground 26, the subject invention incorporates an isolation plate 78 that is disposed between the electrical ground 26 and the calibration object 52. The isolation plate 78 effectively prevents the completion of a circuit between the electrically-charged calibration object 52 and the electrical ground 26. Reference to the electrically-charged calibration object 52 is intended to indicate that the calibration object 52 carries either the electrical charge, the calibration reference voltage, or both. It is to be understood that the isolation plate 78 may be manufactured from any materials that are suitable for insulating the calibration object 52 from the electrical ground 26, i.e., it is not electrically conductive. Examples of such suitable materials include, but are not limited to, rubber and cork. The isolation plate 78 is preferably mounted to the electrical ground 26, i.e., the work table 30, via bolts 80 that are not electrically conductive. Similarly, the calibration object 52 is preferably mounted to the isolation plate 78 via bolts 80 that are also not electrically conductive. It is to be understood that the bolts 80 are used to suitably fix both the isolation plate 78 and the calibration object 52. Of course, other devices suitable for fixing the isolation plate 78 and the calibration object 52 may be utilized including, but not limited to, clamps manufactured from non-conductive materials.

Because the calibration object 52 is electrically connected to the electrical supply 54, the robot controller 60 in the preferred embodiment, the calibration object 52 receives the electrical charge and the calibration reference voltage from the electrical supply 54 through the electrical input lead 58. As such, the position of the robot 12 relative to the calibration object 52 is able to be determined when the tool surface 16 of the robot 12 electrically interacts with the calibration object 52. As will be described below, the tool surface 16 of the robot 12 is able to electrically interact with the calibration object 52 by moving into contact with the calibration object 52 or, not by contacting the calibration object 52, but by moving into a proximity of the calibration object 52 that is close enough to affect a capacitance of the robot 12 and the electrically-charged calibration object 52. Once the position of the robot 12 relative to the calibration object 52 is determined according to the subject invention, the robot 12 is able to be calibrated by methods known in the art that are suitable for calibrating robots 12 using the determined position.

In operation, the method of the subject invention determines the position of the robot 12 relative to the calibration object 52. More specifically, the robot 12 is moved from an initial position where the tool surface 16 is spaced from the calibration object 52 toward the calibration object 52. To move the robot 12, the operator issues a robot motion command that interacts with the robot controller 60 to move the robot 12. Preferably, the robot 12 is moved at a relatively slow rate that provides a suitable amount of time for the detection device 56 to adequately detect the variation. Of course, the slower the rate that the robot 12 is moved, the detection device 56 can detect the variation with increased accuracy. In moving toward the calibration object 52, the tool surface 16 of the robot 12 electrically interacts with the calibration object 52. The tool surface 16 electrically interacts with the calibration object 52 because the robot 12, which supports the tool surface 16, is grounded and the calibration object 52 is electrically charged. It is to be understood that the electrical interaction between the tool surface 16 and the calibration object 52 causes the variation in the electrical charge and in the calibration reference voltage.

In one embodiment of the subject invention disclosed in FIG. 1, the robot 12 is moved from the initial position into contact with the calibration object 52. When the tool surface 16 of the robot 12 electrically interacts with the calibration object 52 by contacting the calibration object 52, the electrical circuit is completed between the electrical supply 54 and the electrical ground 26. More specifically, the electrical circuit is complete from the electrical supply 54, through the electrical input lead 58 to the calibration object 52, and through the robot 12, through the robot ground connection 32, and to the electrical ground 26. Upon completion of the electrical circuit, the calibration reference voltage in the electrical input lead 58 drops, i.e., varies. The detection device 56, in this embodiment the voltage detector 66 that is in electrical communication with the electrical supply 54, detects the variation in the calibration reference voltage due to the electrical interaction. The detected variation indicates the position of the robot 12 relative to the calibration object 52. The position, now determined, is recorded as the tool surface 16 electrically interacts, i.e., contacts, with the calibration object 52. Although not required, the determined position is preferably recorded in the robot controller 60. The recorded position can be processed in view of the geometry of the calibration object 52 and in view of the geometry of the tool surface 16 as understood by the operator of the robot 12, and calibration parameters for calibrating the robot 12 can be established based on output from the processing of the recorded positions according to methods known in the art. As understood by those skilled in the art, the calibration parameters that can be established can include any of the calibration parameters well known in the art including, but not limited to, tool center point location and orientation parameters, robot kinematic and joint angle parameters, and workspace location and orientation parameters.

An electrical parameter threshold is preferably established. The electrical parameter threshold is indicative of movement of the robot 12 when the tool surface 16 of the robot 12 is not electrically interacting with the calibration object 52. The electrical parameter threshold is understood by those skilled in the art from experience and can be modified depending on the desired sensitivity of the system 10. The determined position of the robot 12 relative to the calibration object 52 is recorded for subsequent reference when the variation in the calibration reference voltage is compared to the electrical parameter threshold and the calibration reference voltage exceeds the electrical parameter threshold by a predetermined tolerance. It is to be understood that the predetermined tolerance can be established at zero such that the determined position is recorded as soon as the variation in the calibration reference voltage exceeds the predetermined tolerance.

When the robot 12 is the spot weld robot as set forth above, the voltage detector 66 detects the variation in the calibration reference voltage when at least one of the contact surfaces 34 of the spot weld robot contacts the calibration object 52. Contact by either one of the contact surfaces 34 of the spot weld robot completes the electrical circuit such that the spot weld robot can be calibrated to correct for misalignment of the contact surfaces 34.

In another embodiment of the subject invention, the robot 12 is moved from the initial position into a proximity of the calibration object 52. When the tool surface 16 of the robot 12 electrically interacts with the calibration object 52 by moving into the proximity of the calibration object 52, a capacitor is established between the robot 12, the calibration object 52, and the air between the robot 12 and the calibration object 52. In this embodiment, the electrical circuit is not completed since there is no contact between the tool surface 16 of the robot 12 and the calibration object 52. Once the electrically-grounded robot 12 is in the proximity of the electrically-charged calibration object 52, the electrical charge of the established capacitor is impacted, i.e., it varies. Now the detection device 56, in this embodiment the capacitance detector 68 that is in electrical communication with the electrical supply 54, detects the variation in the electrical charge due to the electrical interaction. Alternatively, in this embodiment, it is to be understood that the detection device 56 may be the voltage detector 66 that detects variations in the calibration reference voltage that are realized even when the tool surface 16 of the robot 12 only moves into the proximity of the calibration object 52 without moving into contact with the calibration object 52. The detected variation indicates the position of the robot 12 relative to the calibration object 52. The position, now determined, is recorded as the tool surface 16 electrically interacts, i.e., moves into proximity, with the calibration object 52. Although not required, the determined position is preferably recorded in the robot controller 60. The recorded position can be processed in view of the geometry of the calibration object 52 and in view of the geometry of the tool surface 16 as understood by the operator of the robot 12, and calibration parameters for calibrating the robot 12 can be established based on output from the processing of the recorded positions according to methods known in the art.

In this embodiment, an electrical parameter threshold is also preferably established. The electrical parameter threshold is indicative of movement of the robot 12 when the tool surface 16 of the robot 12 is not electrically interacting with the calibration object 52. Therefore, the determined position of the robot 12 relative to the calibration object 52 is recorded for subsequent reference when the variation in the electrical charge is compared to the electrical parameter threshold and the variation in the electrical charge exceeds the electrical parameter threshold by a predetermined tolerance. It is to be understood that the predetermined tolerance can be established at zero such that the determined position is recorded as soon as the variation in the electrical charge exceeds the predetermined tolerance.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims. Furthermore, the reference numerals are merely for convenience and are not to be in any way to be read as limiting.

What is claimed is:

1. A robot calibration system comprising:
a ground defining a return for an electrical circuit;
a robot electrically connected to said ground, said robot including at least one robot arm having a tool surface operating within a robot workspace;
an electrical supply defining a source for the electrical circuit that provides an electrical charge and a calibration reference voltage to said calibration system;
a detection device in electrical communication with said electrical supply, said detection device detecting a variation in at least one of said electrical charge and said calibration reference voltage; and
a calibration object electrically insulated from said ground and electrically connected to said electrical supply wherein said calibration object receives said electrical charge and said calibration reference voltage from said electrical supply such that a position of said robot relative to said calibration object can be determined when said tool surface of said robot electrically interacts with said calibration object for calibrating said robot.

2. A robot calibration system as set forth in claim 1 wherein said calibration object is further defined as a calibration plaque electrically insulated from said ground and electrically connected to said electrical supply.

3. A robot calibration system as set forth in claim 1 wherein said electrical supply is further defined as a robot controller defining said source for the electrical circuit, said robot controller providing said electrical charge and said calibration reference voltage to said calibration object.

4. A robot calibration system as set forth in claim 1 wherein said detection device is further defined as a robot controller in electrical communication with said electrical supply, said robot controller detecting said variation in at least one of said electrical charge and said calibration reference voltage.

5. A robot calibration system as set forth in claim 1 wherein said detection device is further defined as a voltage detector in electrical communication with said electrical supply, said voltage detector detecting said variation in said calibration reference voltage when said tool surface of said robot electrically interacts with said calibration object by contacting said calibration object thereby completing the electrical circuit between said electrical supply and said ground.

6. A robot calibration system as set forth in claim 1 wherein said detection device is further defined as a capacitance detector in electrical communication with said electrical supply, said capacitance detector detecting said variation in said electrical charge when said tool surface of said robot electrically interacts with said calibration object by moving into a proximity of said calibration object to affect a capacitance of said robot and said charged calibration object.

7. A robot calibration system as set forth in claim 1 further comprising an isolation plate disposed between said ground and said calibration object for electrically insulating said calibration object from said ground.

8. A robot calibration system as set forth in claim 1 wherein said robot workspace comprises a robot operating workspace and a robot calibration workspace distinct from said robot operating workspace where calibration of said robot occurs.

9. A robot calibration system as set forth in claim 8 wherein said calibration object is disposed in said robot calibration workspace for calibration of said robot.

10. A robot calibration system as set forth in claim 8 in combination with an assembly line having at least one workpiece wherein said assembly line is disposed in said robot operating workspace such that tool surface of said robot arm operates on said at least one workpiece within said robot operating workspace.

11. A robot calibration system as set forth in claim 1 wherein said robot is further defined as a welding robot including first and second welding tips, each of said welding tips having a normally parallel and coincident contact surface with a normal axis extending between said contact surfaces indicating alignment of said contact surfaces.

12. A robot calibration system as set forth in claim 11 wherein said detection device detects said variation in said calibration reference voltage when at least one of said contact surfaces of said welding robot contacts said calibration object thereby completing the electrical circuit such that said robot can be calibrated to correct for misalignment of said contact surfaces.

13. A robot calibration system comprising:
a ground defining a return for an electrical circuit;
a robot electrically connected to said ground, said robot including at least one robot arm having a tool surface operating within a robot workspace;
a robot controller that defines a source for the electrical circuit to provide an electrical charge and a calibration reference voltage to said calibration system, and that detects a variation in at least one of said electrical charge and said calibration reference voltage; and
a calibration object electrically insulated from said ground and electrically connected to said robot controller wherein said calibration object receives said electrical charge and said calibration reference voltage from said robot controller such that a position of said robot relative to said calibration object can be determined when said tool surface of said robot electrically interacts with said calibration object for calibrating said robot.

14. A robot calibration system as set forth in claim 13 wherein said calibration object is further defined as a calibration plaque electrically insulated from said ground and electrically connected to said robot controller.

15. A robot calibration system as set forth in claim 13 wherein said robot controller comprises a voltage detector that detects said variation in said calibration reference voltage when said tool surface of said robot electrically interacts with said calibration object by contacting said calibration object thereby completing the electrical circuit between said robot controller and said ground.

16. A robot calibration system as set forth in claim 13 wherein said robot controller comprises a capacitance detector that detects said variation in said electrical charge when said tool surface of said robot electrically interacts with said calibration object by moving into a proximity of said calibration object to affect a capacitance of said robot and said charged calibration object.

17. A robot calibration system as set forth in claim 13 wherein said robot is further defined as a welding robot including first and second welding tips, each of said welding tips having a normally parallel and coincident contact surface with a normal axis extending between said contact surfaces indicating alignment of said contact surfaces.

18. A method of determining a position of a robot relative to a calibration object external to the robot for calibrating the robot wherein the robot is electrically connected to a ground and an electrical supply and includes at least one robot arm having a tool surface operating within a robot workspace, said method comprising the steps of:

electrically connecting the calibration object to the electrical supply for providing an electrical charge and a calibration reference voltage to the calibration object;

moving the robot from an initial position where the tool surface is spaced from the calibration object toward the calibration object such that the tool surface electrically interacts with the calibration object; and detecting a variation in at least one of the electrical charge and the calibration reference voltage due to the electrical interaction of the tool surface with the calibration object as the robot moves between the initial position and the calibration object to determine the position of the robot for calibrating the robot.

19. A method as set forth in claim 18 wherein the step of moving the robot from the initial position toward the calibration object is further defined as moving the robot from the initial position into contact with the calibration object to complete an electrical circuit between the electrical supply and the ground.

20. A method as set forth in claim 18 wherein the step of moving the robot from the initial position toward the calibration object is further defined as moving the robot from the initial position into a proximity of the calibration object to affect a capacitance of the robot and the charged calibration object.

21. A method as set forth in claim 18 further comprising the step of recording the determined position of the robot relative to the calibration object when the tool surface of the robot electrically interacts with the calibration object.

22. A method as set forth in claim 21 further comprising the step of establishing an electrical parameter threshold to indicate movement of the robot when the tool surface of the robot is not electrically interacting with the calibration object.

23. A method as set forth in claim 22 wherein the step of recording the determined position of the robot relative to the calibration object is further defined as recording the determined position of the robot relative to the calibration object when the variation in at least one of the electrical charge and the calibration reference voltage exceeds the electrical parameter threshold by a predetermined tolerance.

* * * * *